US007047392B2

(12) United States Patent
Goto (10) Patent No.: US 7,047,392 B2
(45) Date of Patent: May 16, 2006

(54) DATA PROCESSING APPARATUS AND METHOD FOR CONTROLLING STAGED MULTI-PIPELINE PROCESSING

(75) Inventor: Harutaka Goto, Kamakura (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 463 days.

(21) Appl. No.: 09/818,910

(22) Filed: Mar. 28, 2001

(65) Prior Publication Data

US 2001/0027514 A1    Oct. 4, 2001

(30) Foreign Application Priority Data

Mar. 28, 2000    (JP)    ............................. 2000-089508

(51) Int. Cl.
*G06F 1/04*    (2006.01)
(52) U.S. Cl. ............................................. 712/1; 712/42
(58) Field of Classification Search .................. 712/42, 712/1
See application file for complete search history.

(56) References Cited

U.S. PATENT DOCUMENTS

| | | | | |
|---|---|---|---|---|
| 5,006,980 A | * | 4/1991 | Sanders et al. ............. | 712/219 |
| 5,410,670 A | * | 4/1995 | Hansen et al. .............. | 711/169 |
| 5,579,525 A | | 11/1996 | Suzuki | |
| 6,119,215 A | * | 9/2000 | Key et al. ...................... | 712/19 |
| 6,272,616 B1 | * | 8/2001 | Fernando et al. ............. | 712/20 |
| 6,477,638 B1 | * | 11/2002 | Gearty et al. ............... | 712/220 |
| 6,529,983 B1 | * | 3/2003 | Marshall et al. ............ | 710/200 |

OTHER PUBLICATIONS

Hennessy, John L and Patterson, David A; Computer Organization and Design—The Hardware/Software Interface; 1998; Morgan Kaufmann Publishers, Inc; 2nd Edition; p. 445.*

* cited by examiner

*Primary Examiner*—William M. Treat
(74) *Attorney, Agent, or Firm*—Oblon, Spivak, McClelland, Maier & Neustadt, P.C.

(57) ABSTRACT

A data processing apparatus that reduces a fanout load of a control signal for controlling a pipeline includes a first pipeline processing portion for executing a processing in five divided stages, a second pipeline processing portion for executing a processing one stage behind the first pipeline processing portion, and a plurality of flip-flops for latching the control signals inputted to the respective stages. The second pipeline processing portion performs the processing in each stage based on delayed control signals generated by once latching the control signals inputted to the respective stages by the flip-flop, thereby reducing the fanout load and signal delay of the control signals. Moreover, a wiring length of a control line for transmitting the control signals can be set to be longer than a conventional wiring length.

15 Claims, 13 Drawing Sheets

PRIOR ART

FIG. 1

PRIOR ART

DATA PROCESSING APPARATUS AND METHOD FOR CONTROLLING STAGED MULTI-PIPELINE PROCESSING

CROSS REFERENCE TO RELATED APPLICATIONS

This application claims the priority right under 35 U.S.C. 119 of Japanese Patent Application No. 2000-89508 filed on Mar. 28, 2000.

BACKGROUND OF THE INVENTION

1. Field of the Invention

The present invention relates to a data processing apparatus for performing a pipeline processing in a plurality of divided stages and, for example, it aims at a data processing apparatus which can be mounted inside a processor.

2. Related Background Art

With the development of multimedia and communication technique, the enhancement of processing properties of a processor has strongly been desired. Examples of a technique for enhancing the processing properties of the processor include a technique of raising an operation clock frequency, and a technique of performing an arithmetic processing in parallel.

However, when a plurality of operation units are disposed inside the processor and an arithmetic processing is executed in parallel, a circuit scale is enlarged, and the processing may not be performed in time by a wiring delay.

Figure 1:
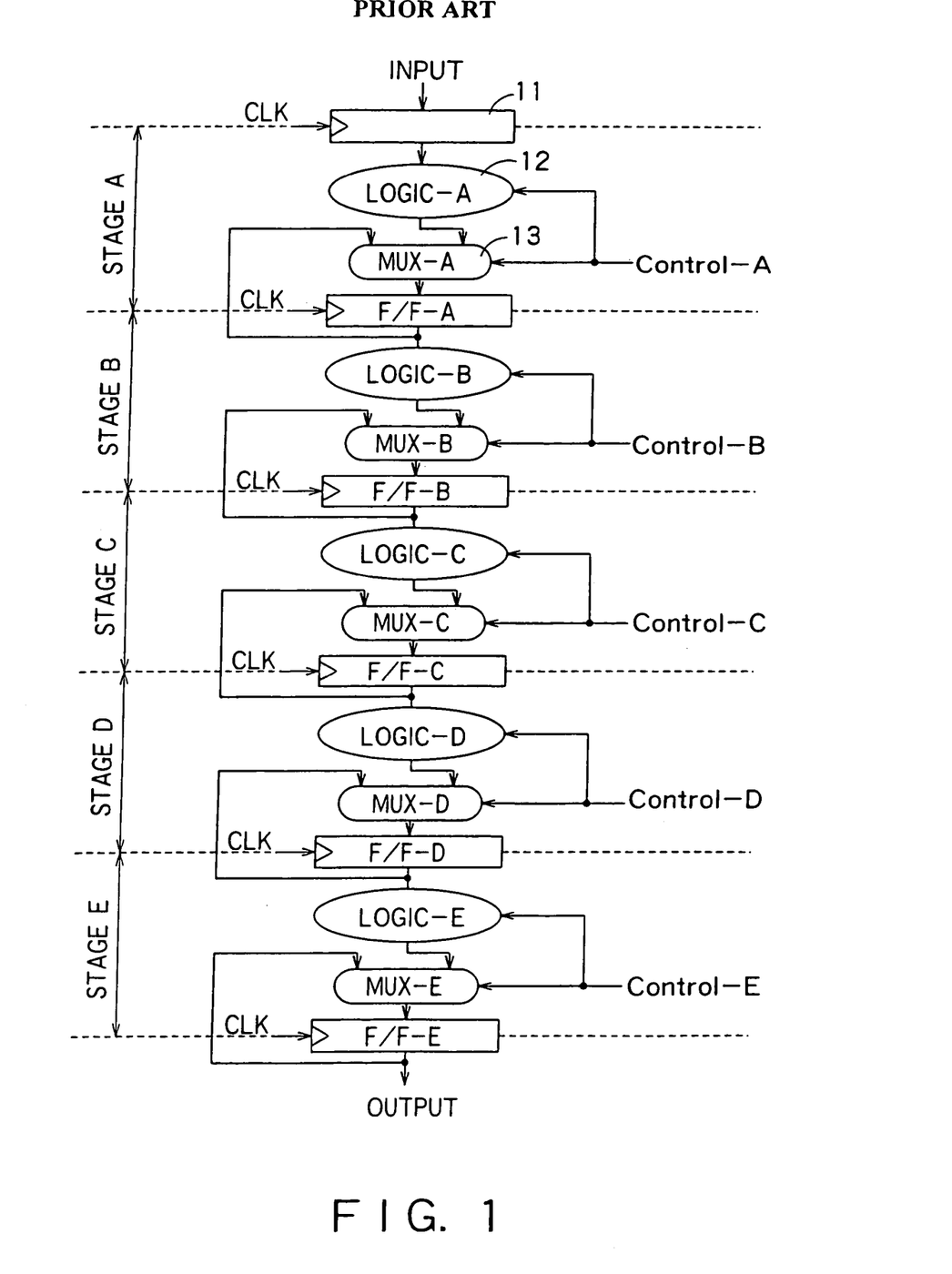
FIG. 1 is a block diagram showing a schematic constitution of a pipeline processing portion inside a processor.

On the other hand, for a recent processor, in order to accelerate execution of an instruction, each instruction is divided into a plurality of stages and subjected to a pipeline processing in many cases. FIG. 1 is a block diagram showing a schematic constitution of a pipeline processor inside the processor, and FIG. 2 is a diagram showing a processing flow.

As shown in FIG. 1, each instruction is divided into five stages A to E and executed in order.

As shown in FIG. 1, each stage is provided with a flip-flop 11 for synchronizing input data, a logic circuit 12, and a multiplexer 13. An output of the multiplexer 13 is inputted to the flip-flop 11 of the next stage.

Figure 2:
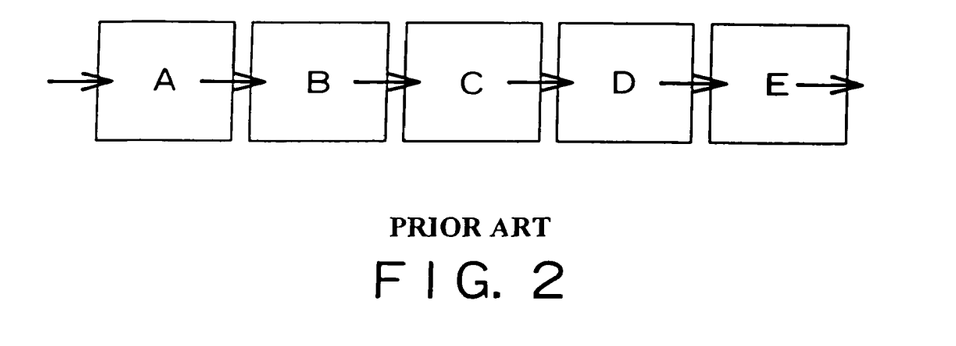
FIG. 2 is a diagram showing a processing flow of FIG. 1.

As shown in FIG. 2, when each instruction is subjected to the pipeline processing, the processor processing properties are enhanced. In order to further enhance the processing properties, however, a plurality of pipeline processing portions are sometimes disposed inside the processor.

Figure 3:
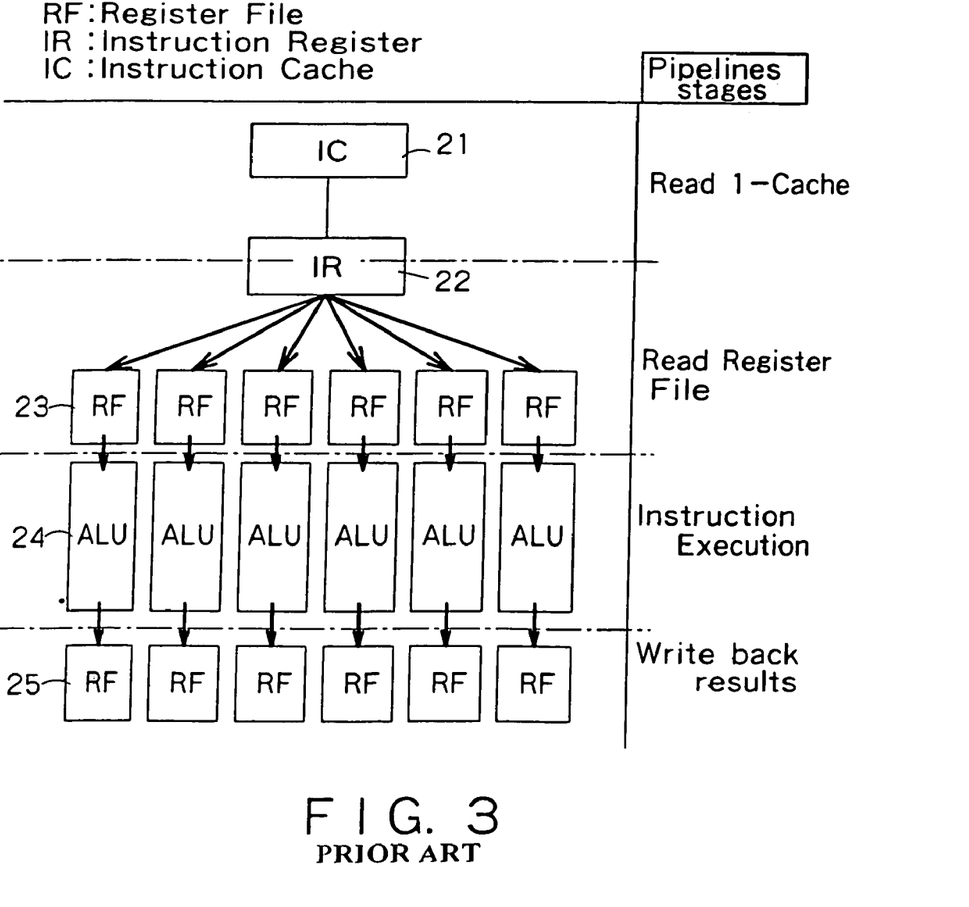
FIG. 3 is a block diagram showing an example in which a plurality of pipeline processing portions are disposed inside the processor.

FIG. 3 is a block diagram showing an example in which a plurality of pipeline processing portions are disposed inside the processor. An instruction read from an instruction cache (IC) 21 of FIG. 3 is dispatched to an empty pipeline processing portion among six pipeline processing portions (ALU) 24 via an instruction register (IR) 22, and then is executed by the empty pipeline processing portion. Data read out from a register file (RF) 23 in accordance with the instruction is calculated by the pipeline processing portion 24, and the execution result of the instruction is written back to a register file (RF) 25.

Figure 4:
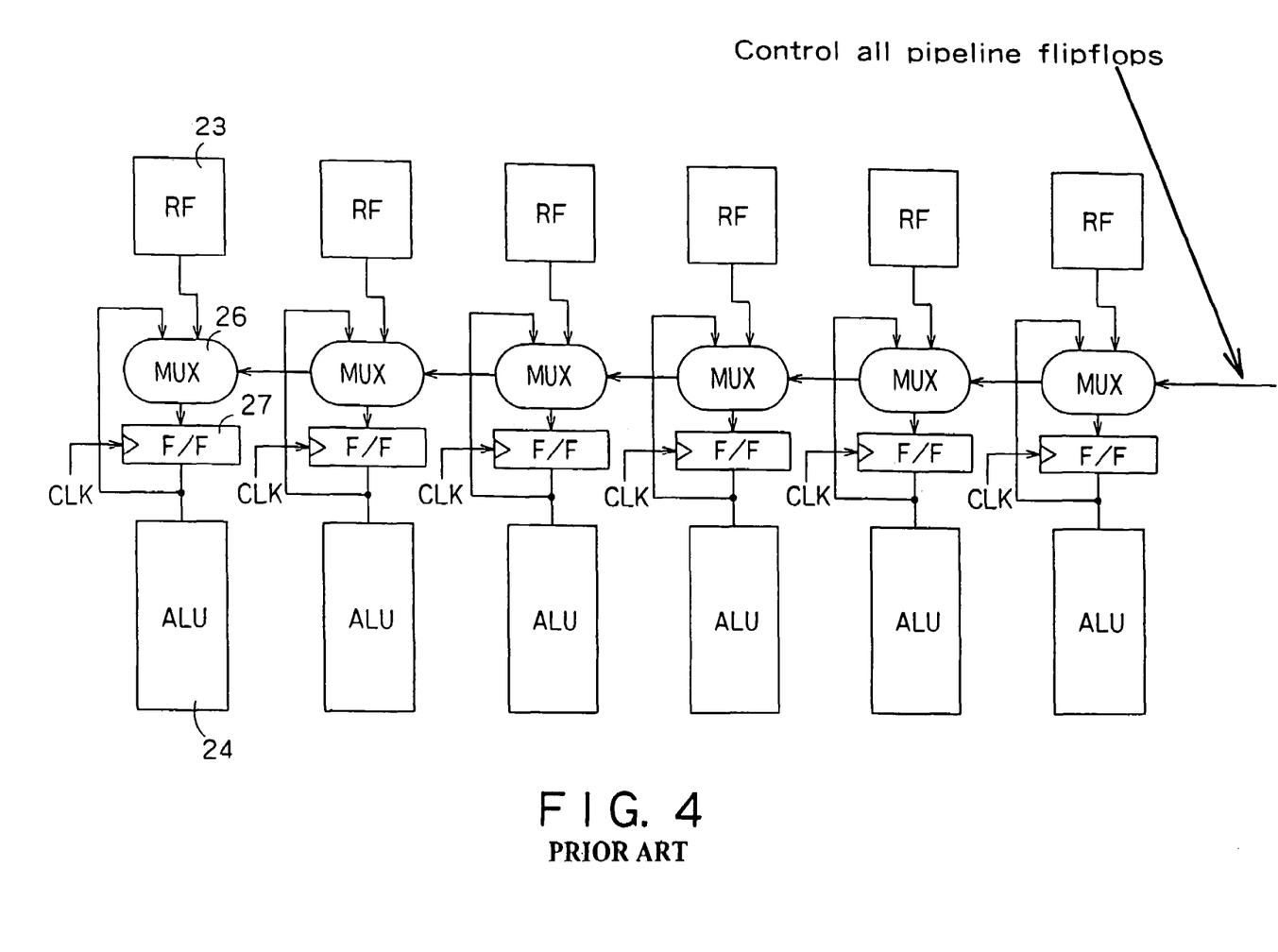
FIG. 4 is a block diagram showing a detailed constitution in the vicinity of an input of the pipeline processing portion of FIG. 3.

FIG. 4 is a block diagram showing a detailed constitution in the vicinity of an input of the pipeline processing portion 24. As shown in FIG. 4, a multiplexer 26 and flip-flop 27 are disposed between the register file 23 and pipeline processing portion 24. Since each pipeline processing portion 24 performs the processing in parallel, a control signal Control is supplied to each multiplexer 26 via a common control line, and each pipeline processing portion 24 performs an arithmetic processing based on the control signal Control.

However, when a plurality of pipeline processing portions are controlled with one control line, with a larger number of pipeline processing portions and a longer wiring length of the control line, fanout load of a control signal increases. In the recent processor, the operation clock frequency is very high. Therefore, there is possibility that the processing in each stage is not in time because of a control signal delay.

In order to reduce the fanout load of the control signal, it is preferable to reduce the wiring length of the control line. However, to enhance the processor processing properties, the number of pipeline processing portions has to be increased, and the wiring length of the control line is necessarily increased.

As another technique for reducing the fanout load of the control signal, the control signal may be buffered on a tree and supplied to each pipeline processing portion, or a plurality of control signals may be generated beforehand.

Furthermore, in recent years, to develop the processor and ASIC, a technique of arbitrarily combining various prepared function blocks to design LSI has become general. When the designing technique is employed, the combination of function blocks cannot be completely specified. Therefore, it is preferable to preset the fanout load of each signal with an allowance. However, it has heretofore been difficult to set the fanout load of the signal having a critical timing to a value such that erroneous operation is prevented.

SUMMARY OF THE INVENTION

The present invention has been developed in consideration of this respect, and an object thereof is to provide a data processing apparatus which can reduce a fanout load of a control signal for controlling a pipeline.

To achieve the object, there is provided a data processing apparatus configured to perform a pipeline processing in a plurality of divided stages, comprising:

a first pipeline processing portion configured to perform a processing in each stage based on a control signal inputted to each stage;

a first latch portion configured to latch the control signal inputted to each stage with a predetermined clock; and a second pipeline processing portion, disposed separately from the first pipeline processing portion, configured to perform the processing in each stage based on the control signal latched by the first latch portion.

According to the present invention, instead of directly supplying the control signal to all the pipeline processing portions, the control signal is once latched by the first latch portion and supplied to at least some of the pipeline processing portions, so that the control signal fanout load can be reduced. Therefore, even with a large number of pipeline processing portions, propagation delay of the control signal can be reduced. Moreover, even if a wiring length of the control line for transmitting the control signal is long, the

DESCRIPTION OF THE PREFERRED EMBODIMENTS

A data processing apparatus of the present invention will concretely be described hereinafter with reference to the drawings. An example of a pipeline processing portion mounted inside a processor will be described hereinafter.

Figure 5:
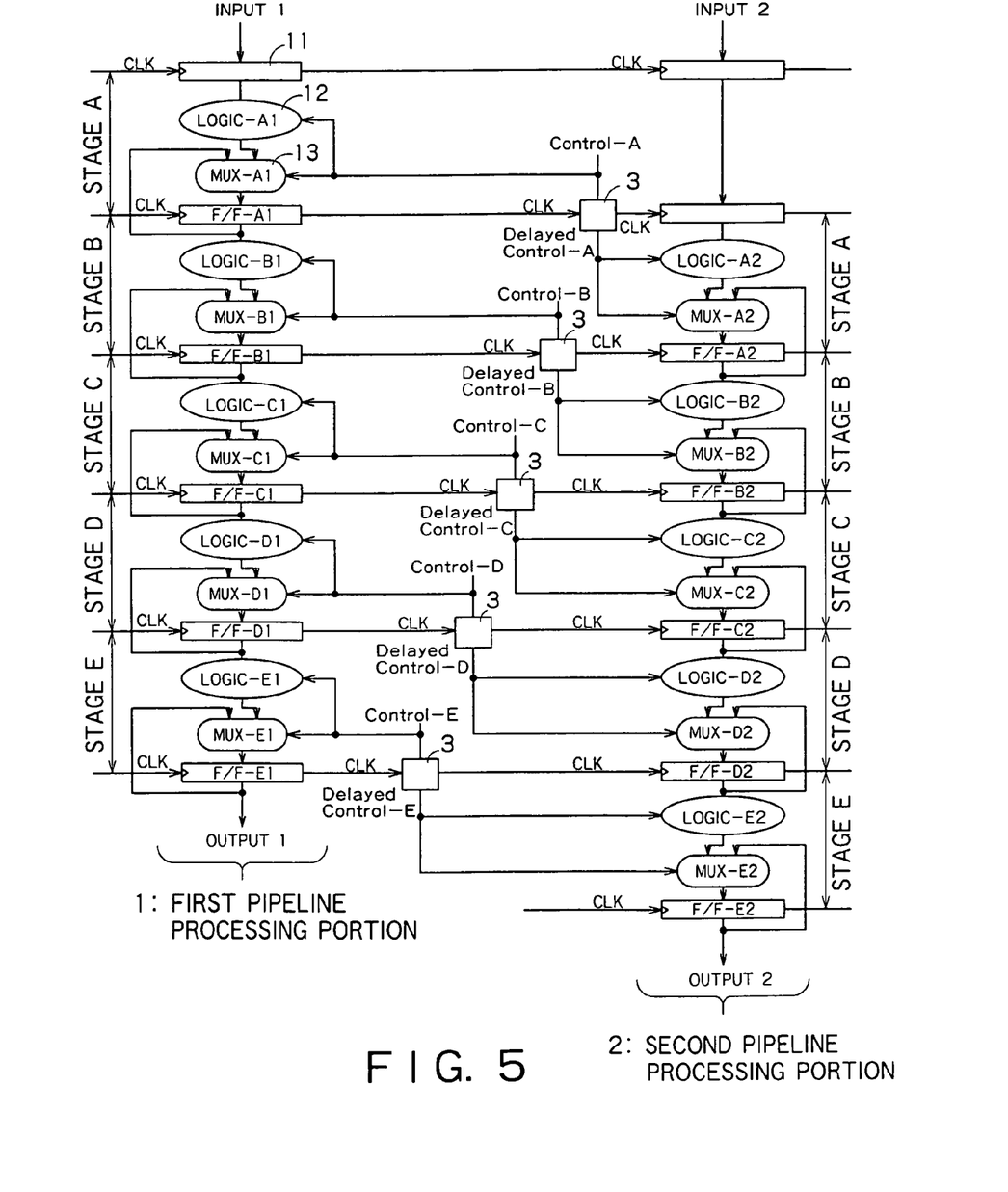
FIG. 5 is a block diagram showing one embodiment of a data processing apparatus according to the present invention.

FIG. 5 is a block diagram showing one embodiment of the data processing apparatus according to the present invention. The data processing apparatus of FIG. 5 includes a first pipeline processing portion 1 for executing a processing in five divided stages A to E, a second pipeline processing portion 2 for executing the processing one stage behind the first pipeline processing portion 1, and a plurality of flip-flops (first latch portion) 3 for latching control signals inputted to the respective stages.

FIG. 5 shows an example in which respective separate control signals Control-A, Control-B, Control-C, Control-D, Control-E are supplied to the respective stages, but a common control signal may be supplied to a plurality of stages.

The first and second pipeline processing portions 1, 2 are similarly constituted, and each stage includes a flip-flop 11, logic circuit 12 and multiplexer 13.

The flip-flop 11 latches a previous-stage processing result by a clock CLK dividing the respective stages. Additionally, FIG. 5 shows only one flip-flop 11, but flip-flops 11 are actually disposed for the number of data bits.

The logic circuit 12 performs a predetermined logic and arithmetic operation based on the control signals inputted to the respective stages. Additionally, the logic circuit 12 can perform the logic and arithmetic operation without using any control signal. The multiplexer 13 selects an output of the logic circuit 12, or an output of the next-stage register file, based on the control signal inputted to each stage.

The flip-flops 3 of FIG. 5 latch the control signals Control-A to E inputted to the respective stages by the clocks CLK dividing the respective stages. Thereby, the respective control signals Control-A to E can be delayed in accordance with a stage processing timing in the second pipeline processing portion 2. This control signal will hereinafter be referred to as a delayed control signal. The delayed control signal is used in the processing in the second pipeline processing portion 2. This delayed control signal is a signal for controlling a processing operation of the first and second pipeline processing portions 1, 2, and concretely a signal for controlling whether or not the pipeline processing is to be stalled.

The control signals Control-A to E are latched by the flip-flops 3 in order to reduce fanout load of the control signals Control-A to E. The control signals Control-A to E are directly supplied to the first pipeline processing portion 1 of FIG. 5 via control lines, while the delayed control signal once latched by the flip-flop 3 is supplied to the second pipeline processing portion 2. Therefore, the delayed control signal supplied to the second pipeline processing portion 2 is not influenced by the fanout load of the control signals Control-A to E on the control line.

Figure 6A:
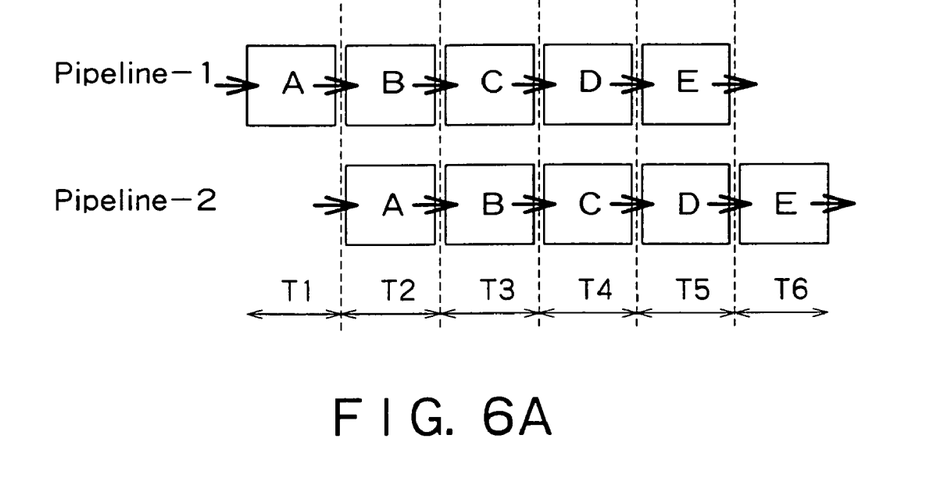
FIGS. 6A and 6B are explanatory views of operation of first and second pipeline processing portions.
Figure 6B:
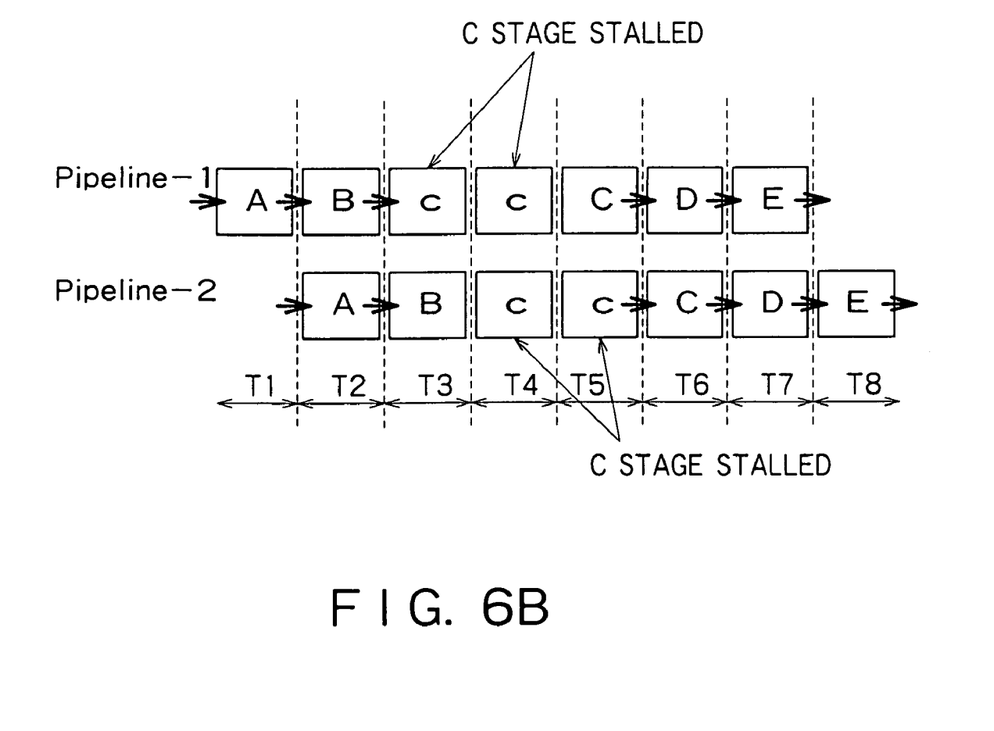

FIG. 6 is an explanatory view of the operation of the first and second pipeline processing portions 1, 2, FIG. 6A shows the operation for a case in which the pipeline processing is not stalled, and FIG. 6B shows the operation for a case in which the pipeline processing is stalled.

As shown in FIG. 6, the first pipeline processing portion 1 performs the processing earlier than the second pipeline processing portion 2 by one cycle of the clock CLK. Moreover, when the first pipeline processing portion 1 is stalled for some reason, the processing is interrupted as shown in periods T3, T4 of FIG. 6B. Accordingly, the processing of the second pipeline processing portion 2 is also interrupted (periods T4, T5).

In the data processing apparatus of FIG. 5, data transfer between the first and second pipeline processing portions 1, 2 is not taken into consideration, but a processing result of one of the first and second pipeline processing portions 1, 2 may be transmitted to the other pipeline processing portion.

Figure 7:
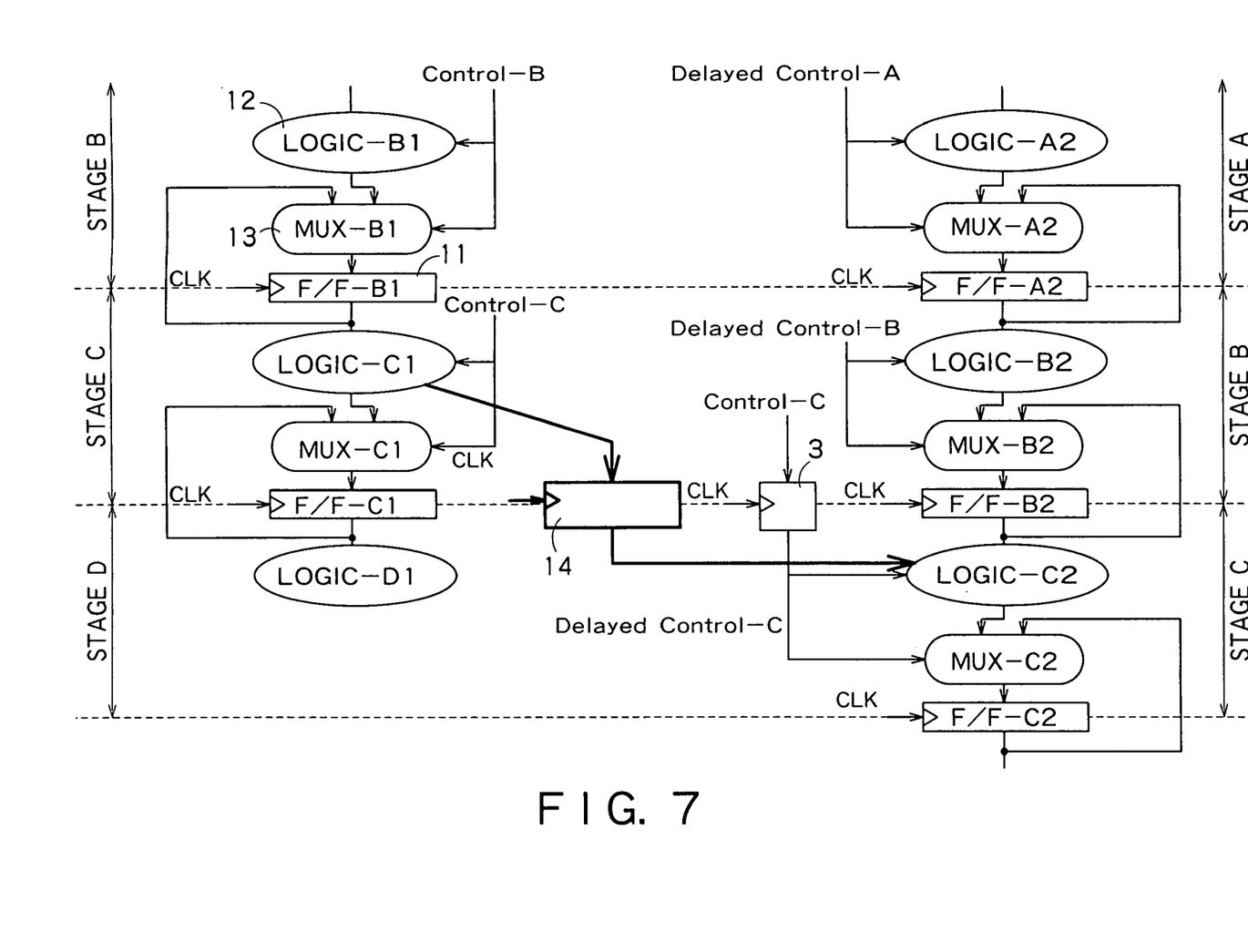
FIG. 7 is a block diagram showing one example of the data processing apparatus in which a processing result in the first pipeline processing portion can be transmitted to the second pipeline processing portion.

For example, FIG. 7 is a block diagram showing one example of the data processing apparatus in which the processing result in the first pipeline processing portion 1 can be transmitted to the second pipeline processing portion 2. The first pipeline processing portion 1 performs the processing earlier than the second pipeline processing portion 2 by one cycle of the clock CLK. Therefore, when the first pipeline processing portion 1 transmits data to the second pipeline processing portion 2, the data to be transmitted needs to be matched with a timing of the second pipeline processing portion 2.

Therefore, in FIG. 7, there is disposed a flip-flop (second latch portion) 14 for latching an output of the logic circuit 12 in the stage C of the first pipeline processing portion 1. The flip-flop 14 latches the output of the logic circuit 12 in synchronization with the clock CLK for dividing the stages, and supplies latched data to the logic circuit 12 in the second pipeline processing portion 2. Since the second pipeline processing portion 2 operates one clock behind the first pipeline processing portion 1, the second pipeline processing portion 2 can receive the processing result in the stage C of the first pipeline processing portion 1, and perform the processing in the stage C.

Additionally, FIG. 7 shows the example in which the processing result of the stage C of the first pipeline processing portion 1 is transmitted to the second pipeline processing portion 2. When the processing result of another stage is transmitted to the second pipeline processing portion 2, the flip-flop 14 may be disposed in the transmitter stage similarly as FIG. 7.

Figure 8:
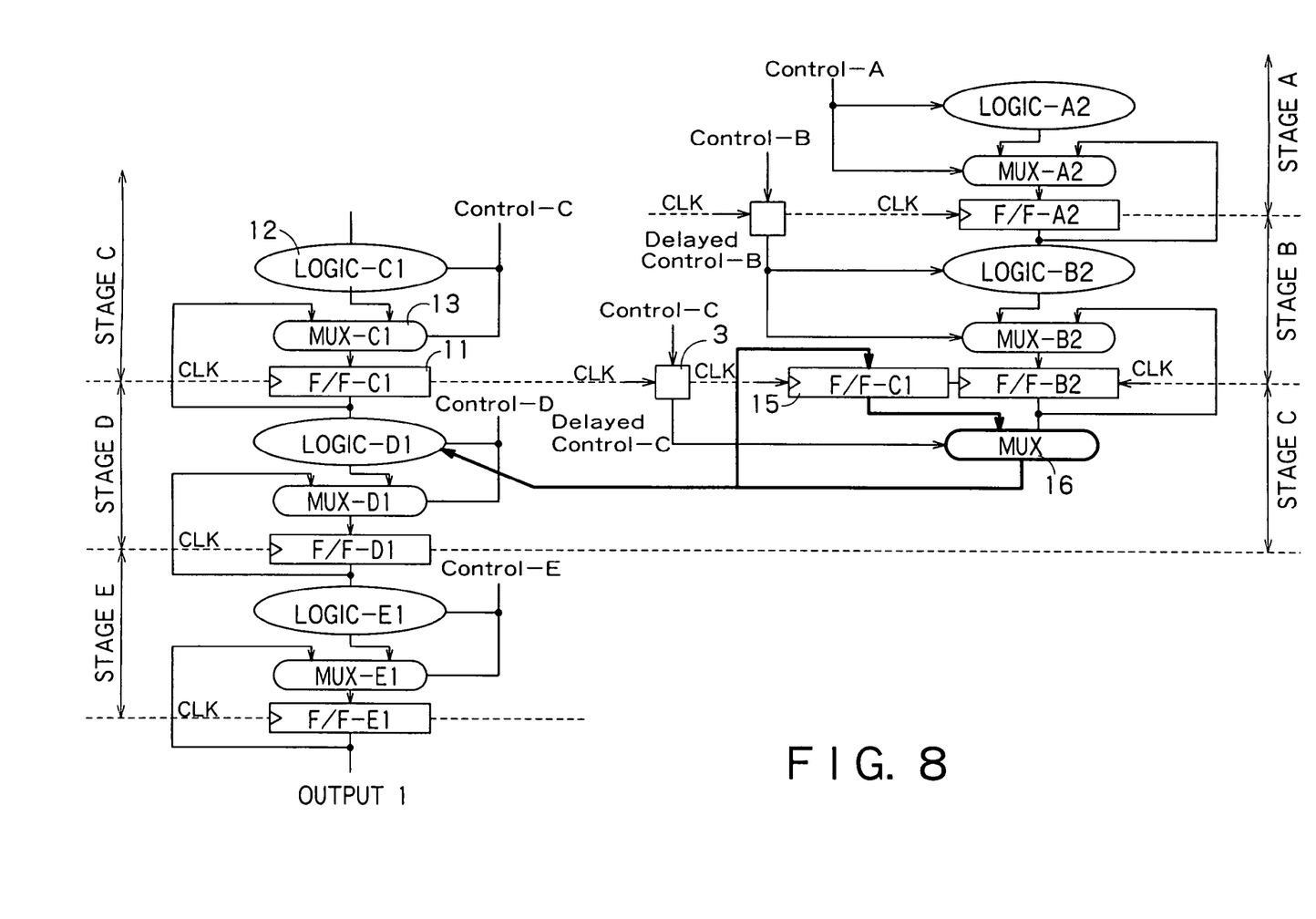
FIG. 8 is a block diagram showing one example of the data processing apparatus in which the processing result in the second pipeline processing portion can be transmitted to the first pipeline processing portion.

On the other hand, FIG. 8 is a block diagram showing one example of the data processing apparatus in which the processing result in the second pipeline processing portion 2 can be transmitted to the first pipeline processing portion 1.

The second pipeline processing portion 2 operates one clock behind the first pipeline processing portion 1. Therefore, when the processing result in a certain stage of the second pipeline processing portion 2 is transmitted to the first pipeline processing portion 1, the result is transmitted to the subsequent stage. FIG. 8 shows an example in which the processing result in the stage C of the second pipeline processing portion 2 is transmitted to the stage D of the first pipeline processing portion 1.

When the data is transmitted to the first pipeline processing portion 1 from the second pipeline processing portion 2, the first pipeline processing portion 1 is considered to be stalled in some case. In this case, the data to be transmitted has to be held until the first pipeline processing portion 1 resumes the processing.

Therefore, in FIG. 8, there are disposed a flip-flop (third latch portion) 15 for latching the data to be transmitted to the first pipeline processing portion 1 from the second pipeline processing portion 2, and a multiplexer (selector) 16 for selecting either one of an output of the flip-flop 15 and the processing result in the stage C of the second pipeline processing portion 2.

If the first pipeline processing portion 1 is not stalled when the processing result in the stage C of the second pipeline processing portion 2 is obtained, the multiplexer 16 selects the processing result and transmits the result to the stage D of the first pipeline processing portion 1. Moreover, when the processing result in the stage C of the second pipeline processing portion 2 is obtained and the first pipeline processing portion 1 is stalled, the flip-flop 15 latches the processing result in the stage C till the completion of the stall.

Additionally, FIG. 8 shows an example in which the flip-flop 15 for latching the processing result in the stage C of the second pipeline processing portion 2 and the multiplexer 16 are disposed, but the flip-flop 15 and multiplexer 16 of FIG. 8 may be disposed in another stage. Moreover, the flip-flop 14 of FIG. 7 and the flip-flop 15 and multiplexer 16 of FIG. 8 may be disposed.

As described above, in the present embodiment, when a plurality of pipeline processing portions perform processings in parallel, for some of the pipeline processing portions, the processing is performed in each stage based on the delayed control signals Control-A to E generated by once latching the control signals Control-A to E inputted to the respective stages by the flip-flop 3. Therefore, the fanout load of the control signals Control-A to E is reduced, and signal delays of the control signals Control-A to E can be reduced. Moreover, even if a long wiring of the control line for transmitting the control signals Control-A to E is long, the flip-flop 3 is disposed on the way of the wiring and the signal can be synchronized with the clock. Therefore, the wiring length of the control line can set to be longer more than a conventional wiring length.

Furthermore, even with a large number of pipeline processing portions, the corresponding number of flip-flops 3 may be disposed. Therefore, the operation can be stabilized regardless of the number of pipeline processing portions.

In the aforementioned embodiment, the example in which two pipeline processing portions 1, 2 are disposed in the data processing apparatus has been described, but the number of pipeline processing portions and the number of pipeline stages are not particularly limited.

Moreover, FIG. 5 shows the example in which the control signals Control-A to E are latched with the clock CLK for dividing the stages, but the control signals Control-A to E may be latched at a timing other than that of the clock CLK.

FIG. 7 shows the example in which the control signal Control-C inputted to a logic circuit LOGIC-C1 and multiplexer MUX-C1 of the stage C in the left-side pipeline processing portion is latched by the flip-flop 3 and the resulting delayed control signal is supplied to the stage C in the right-side pipeline processing portion, but the control signal Control-C and delayed control signal are sometimes utilized in a plurality of places in the respective pipeline processing portions.

Figure 9:
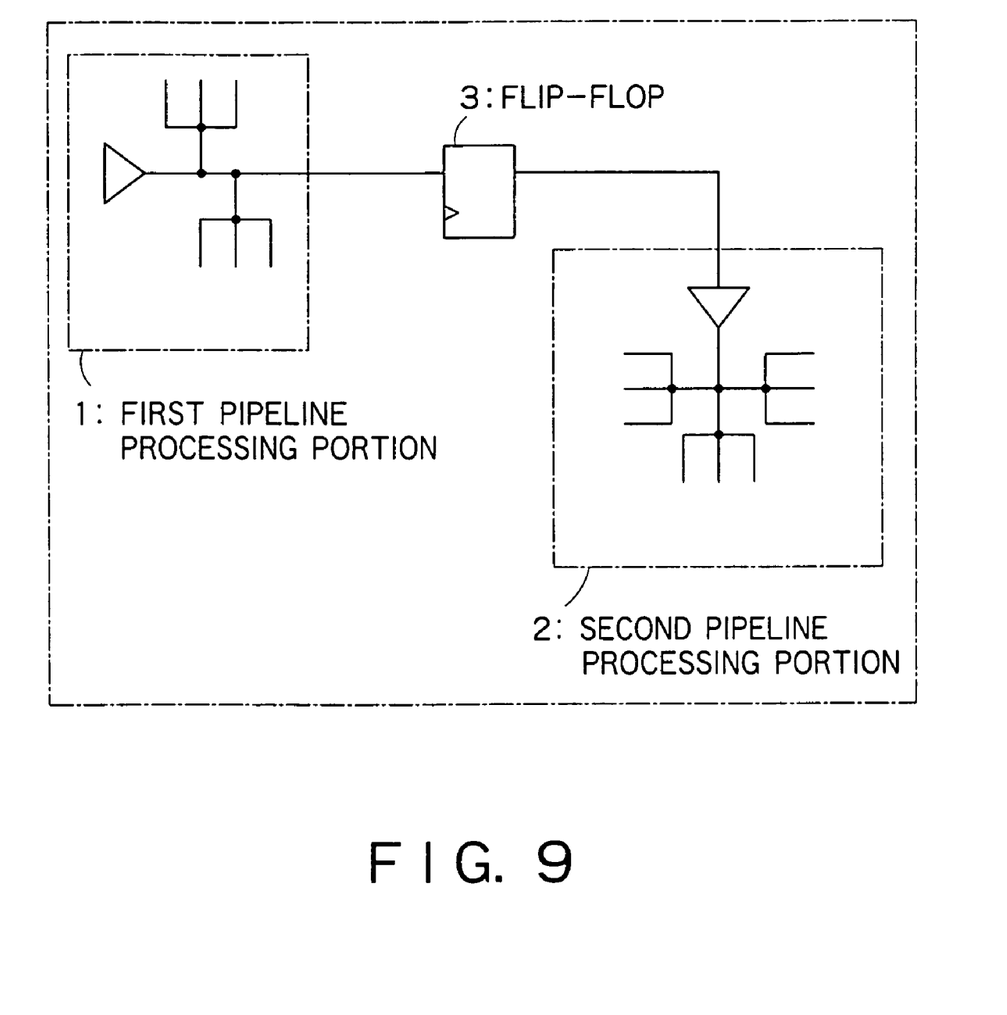
FIG. 9 is a diagram showing an example in which the control signal is branched into a plurality of signals in the first and second pipeline processing portions.

FIG. 9 shows an example in which the control signal outputted from a buffer is branched into a plurality of signals in the first pipeline processing portion 1, one branched signal is latched by the flip-flop to generate the delayed control signal, and the generated delayed control signal is further branched into a plurality of signals in the second pipeline processing portion 2.

When the number of branched control signals is large in this manner, the buffer and flip-flop are disposed in the course of branching, so that the fanout load of the control signal can be prevented from increasing. Moreover, even when the first and second pipeline processing portions 1, 2 are mounted in positions apart from each other on a die, the flip-flop for latching the control signal is disposed between the pipeline processing portions, so that deviation of the clock from an edge can be reduced.

Figure 10:
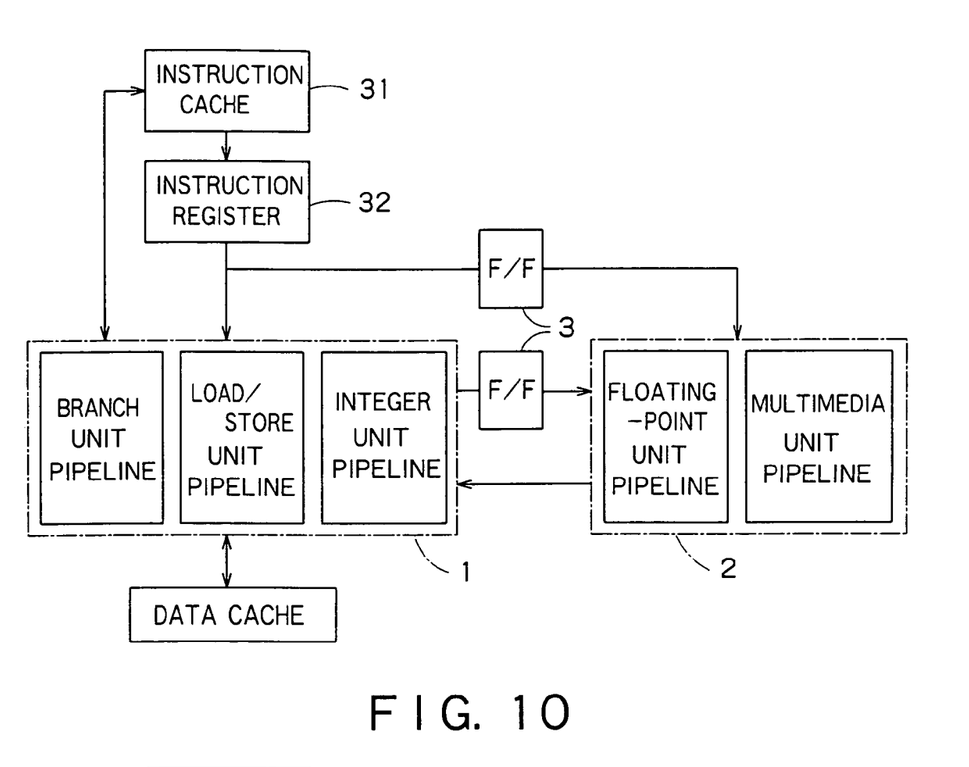
FIG. 10 is a diagram showing a constitution in the processor.

On the other hand, FIG. 10 is a block diagram showing an internal constitution of the processor. The data is directly supplied to the first pipeline processing portion 1 from an instruction cache 31 via an instruction register 32, and once latched by the flip-flop 3 before supplied to the second pipeline processing portion 2.

The first pipeline processing portion 1 executes the processing one stage before the second pipeline processing portion 2. Therefore, when the data is transmitted to the second pipeline processing portion 2 from the first pipeline processing portion 1, the data is once latched by the flip-flop 3 and timing is adjusted. Conversely, when the data is transmitted to the first pipeline processing portion 1 from the second pipeline processing portion 2, the flip-flop is unnecessary.

The first pipeline processing portion 1 of FIG. 10 includes an integer unit pipeline, load/store unit pipeline, and branch unit pipeline, and the respective pipelines exchange the data with a data cache. Moreover, the second pipeline processing portion 2 includes a floating-point unit pipeline and multimedia unit pipeline.

Additionally, types of pipelines disposed inside the first and second pipeline processing portions 1, 2 are not especially limited, or are not limited to those of FIG. 10.

For example, the integer unit pipeline and load/store unit pipeline may be disposed in the second pipeline processing portion 2, and the floating-point pipeline and multimedia unit pipeline may be disposed in the first pipeline processing portion 1.

Figure 11:
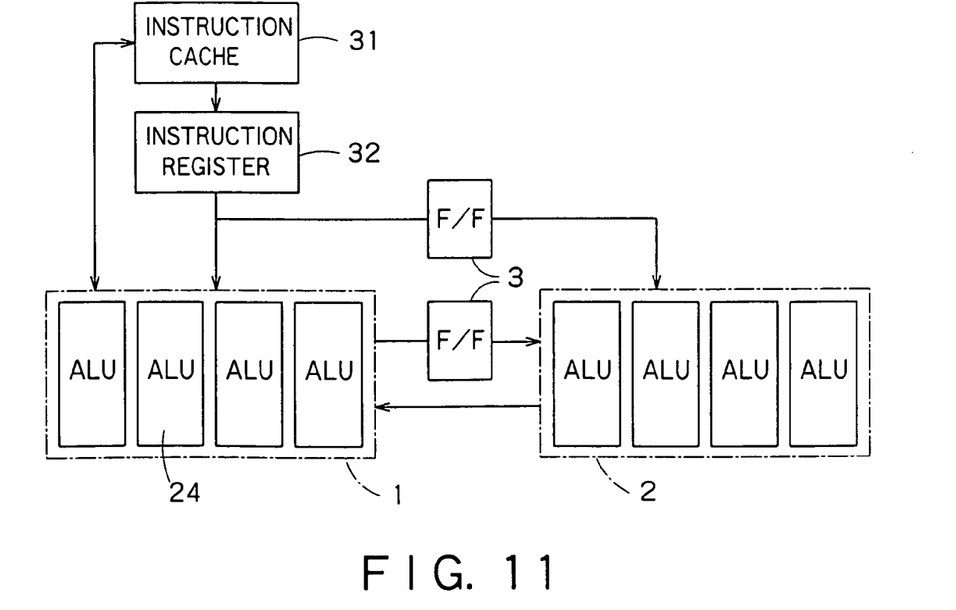
FIG. 11 is a block diagram showing an internal constitution of a plural data streams (SIMD) instruction type processor.

On the other hand, FIG. 11 is a block diagram showing an internal constitution of a plural data stream (SIMD) instruction type processor. As shown in FIG. 11, a plurality of arithmetic and logic units (ALU) 24 are disposed inside the first and second pipeline processing portions 1, 2. The data passed from the instruction cache 31 via the instruction register 32 is supplied to the first pipeline processing portion 1 as it is, and once latched by the flip-flop 3 before supplied to the second pipeline processing portion 2. Moreover, the first pipeline processing portion 1 performs the processing one stage before the second pipeline processing portion 2. Therefore, when the data is transmitted to the second pipeline processing portion 2 from the first pipeline processing portion 1, the data is once latched by the flip-flop 3. Conversely, when the data is transmitted to the first pipeline processing portion 1 from the second pipeline processing portion 2, the flip-flop is unnecessary.

Additionally, FIG. 5, and the like show the example in which the second pipeline processing portion 2 performs the processing one stage (one clock) behind the first pipeline processing portion 1, but the second pipeline processing portion 2 may perform the processing with a delay amount other than one stage.

Figure 12:
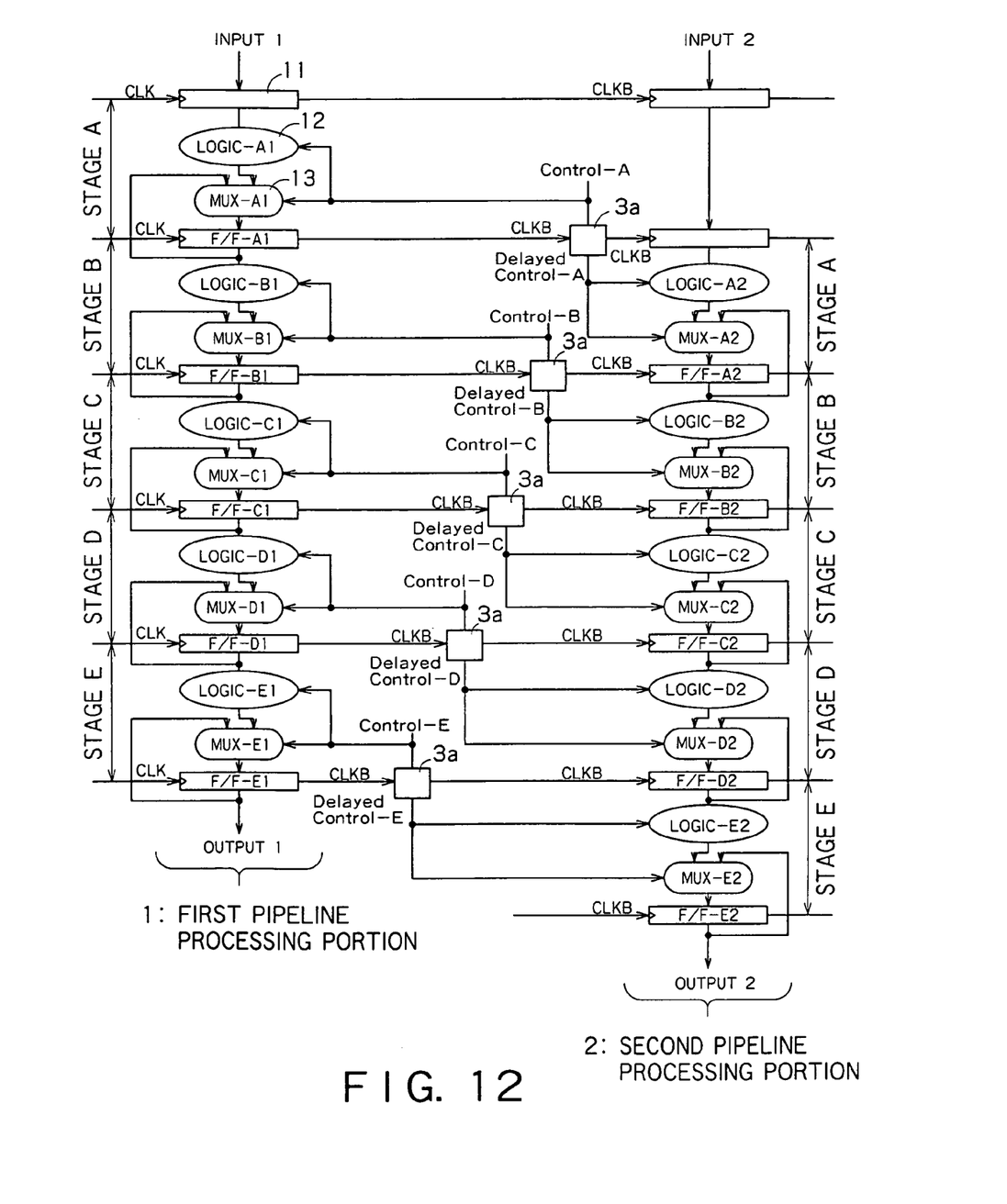
FIG. 12 is a diagram showing an example in which the second pipeline processing portion performs a processing a half clock behind the first pipeline processing portion.

FIG. 12 shows an example in which the second pipeline processing portion 2 performs the processing a half clock behind the first pipeline processing portion 1. In FIG. 12, a latch 3*a* is disposed instead of the flip-flop 3 of FIG. 5, and each latch 3*a* latches the control signals Control-A to C with a falling edge of the clock CLK for dividing the stages, and supplies the latched delayed control signal to the second pipeline processing portion 2.

Figure 13:
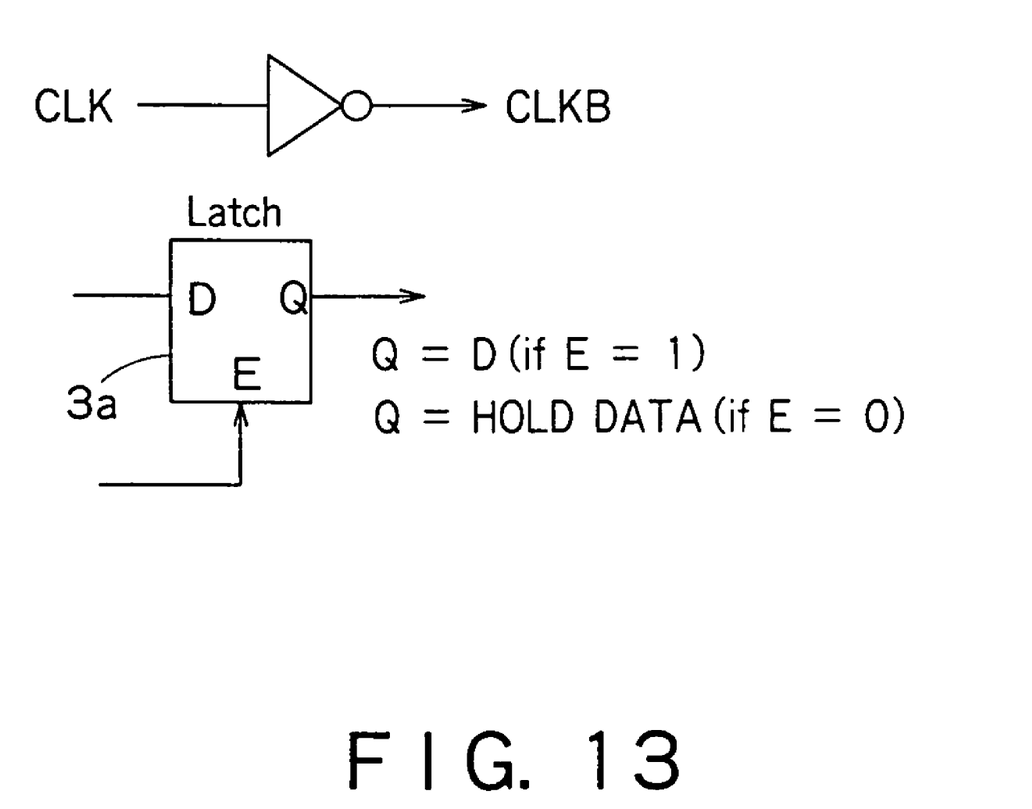
FIG. 13 is a diagram showing a detailed constitution of a latch.

FIG. 13 is a diagram showing a detailed constitution of the latch 3*a*. As shown in FIG. 13, different from the flip-flop, the latch 3*a* outputs the data inputted to an input terminal D via a terminal Q when a terminal E is at a high level, and holds logic of the input terminal D immediately before the terminal E when the terminal E reaches a low level.

Figure 14:
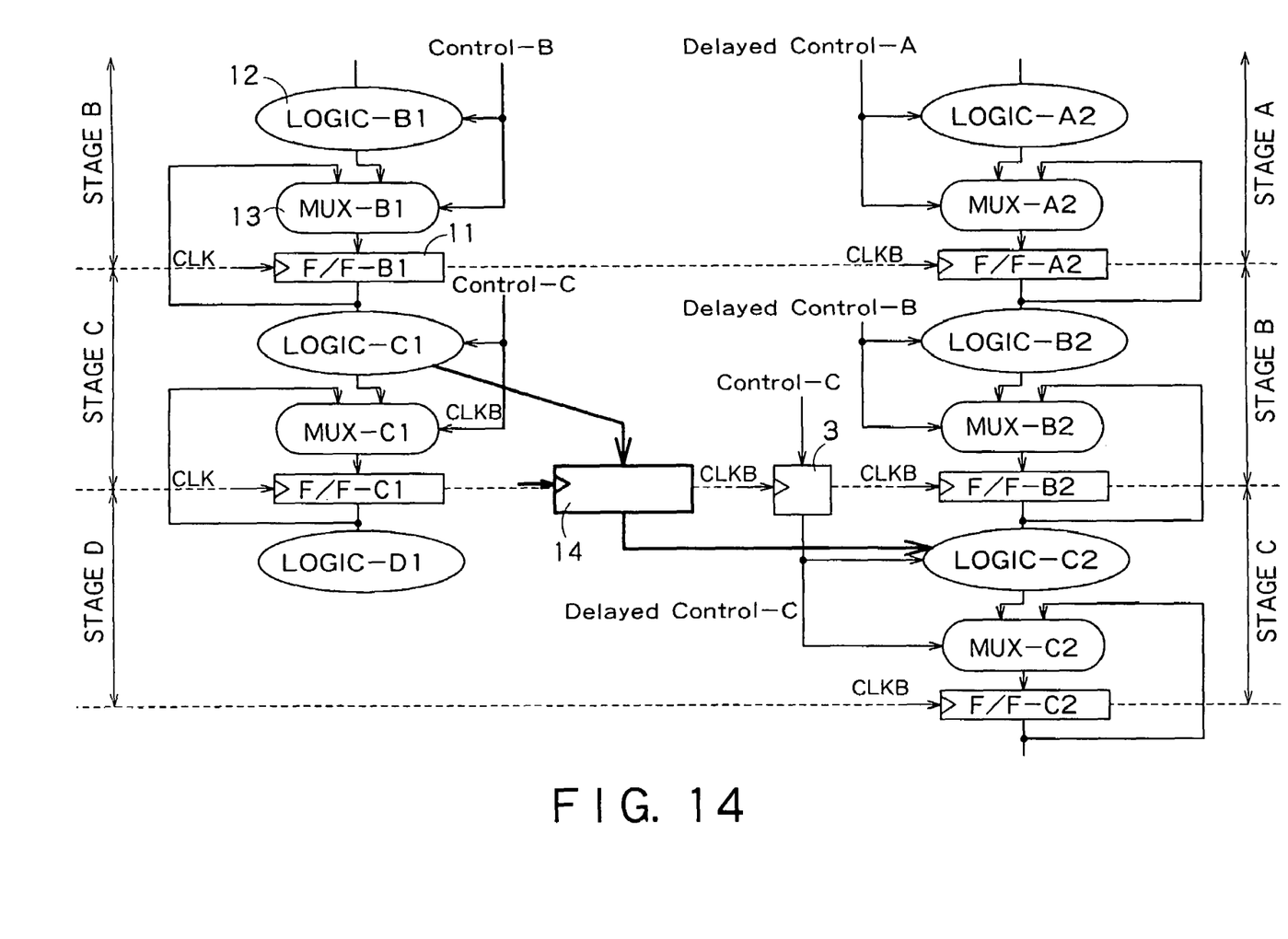
FIG. 14 is a diagram corresponding to FIG. 7, and shows an example in which the second pipeline processing portion performs the processing a half clock behind the first pipeline processing portion.

On the other hand, FIG. 14 corresponds to FIG. 7, and shows an example in which an operation result of the logic circuit LOGIC-C1 in the stage C of the first pipeline processing portion 1 is latched by the latch 3*a* at a falling edge of the clock CLK and the latched result is supplied to the stage C of the second pipeline processing portion 2.

Figure 15:
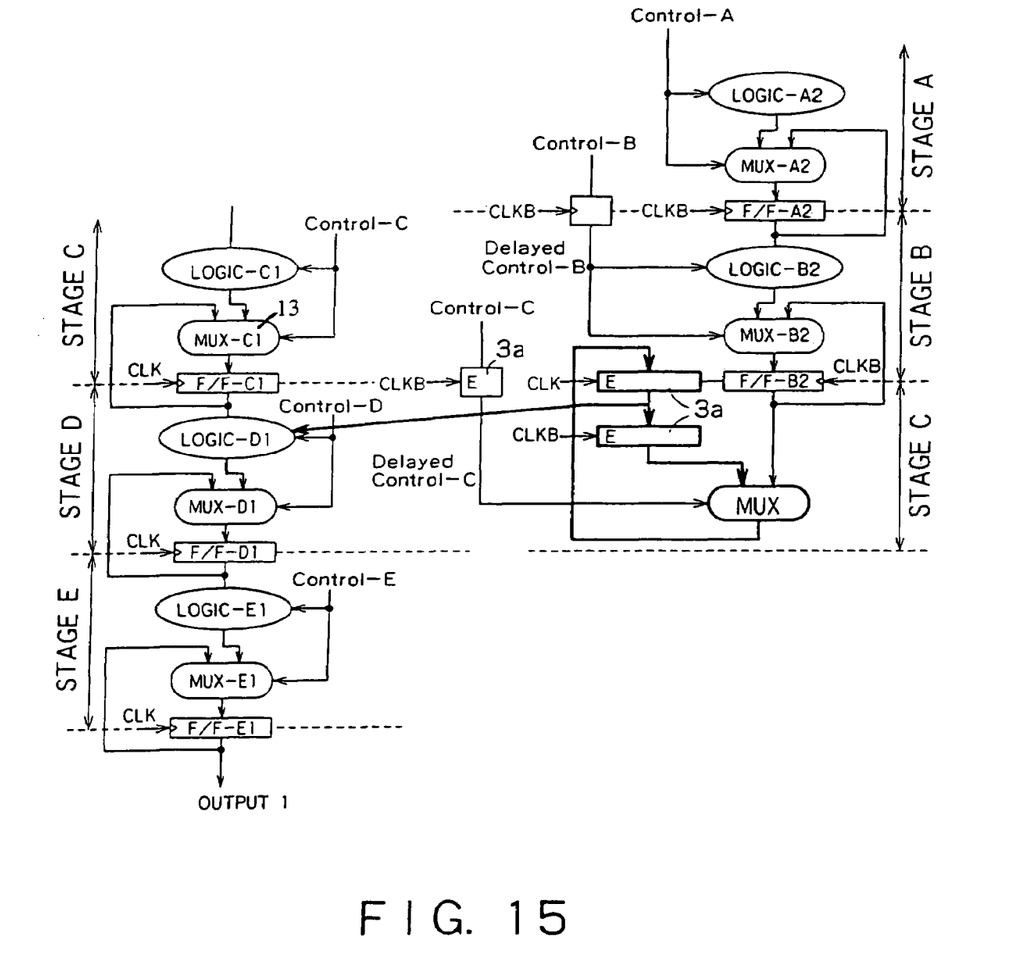
FIG. 15 is a diagram corresponding to FIG. 8, and shows an example in which the second pipeline processing portion performs the processing a half clock behind the first pipeline processing portion.

On the other hand, FIG. 15 corresponds to FIG. 8, and shows an example in which the second pipeline processing portion 2 transmits the data to the first pipeline processing portion 1. Two-stage latches 3*a* connected in tandem, and multiplexer 13 are disposed inside the second pipeline processing portion 2. The first-stage latch 3*a* latches an output of the multiplexer 13 when the clock CLK is at the high level, and the second-stage latch 3*a* latches the output of the first-stage latch 3*a* when the clock CLK is at the low level. The output of the first-stage latch 3*a* is transmitted to the first pipeline processing portion 1.

Moreover, the multiplexer 13 selects either one of the output of the second-stage latch and the data from the stage B in accordance with the output of the latch for latching the data at the falling edge of the clock CLK.

What is claimed is:

1. A data processing apparatus configured to perform a pipeline processing by dividing a pipeline into a plurality of stages, comprising:
    a first pipeline processing portion configured to perform the processing in a plurality of stages in sequence based on a plurality of control signals provided corresponding to the respective stages, said control signals having timings asynchronous to each other;
    a first latch portion configured to latch said control signals inputted to the respective stages with a predetermined clock, said first latch portion having a plurality of flip-flops which are provided corresponding to the respective control signals and latch the corresponding control signals; and
    a second pipeline processing portion, disposed separately from said first pipeline processing portion, configured to perform the processing in a plurality of stages in sequence based on the control signal latched by said first latch portion.

2. The data processing apparatus according to claim 1, wherein said control signals are signals for controlling whether or not the pipeline processing is stalled.

3. The data processing apparatus according to claim 1, further comprising second latch portion configured to latch a processing result in at least one stage in said first pipeline processing portion with said predetermined clock,
    wherein said second pipeline processing portion utilizes data latched by said second latch portion to perform the processing in the stage corresponding to the data latched by said second latch portion.

4. The data processing apparatus according to claim 1, further comprising:
a third latch portion configured to latch a processing result in at least one stage in said second pipeline processing portion with said predetermined clock; and
a selector configured to select either one of data before latched by said third latch portion and data latched by said third latch portion,
wherein said selector selects a latch output of said third latch portion after the completion of stall and transmits the latch output to said first pipeline processing portion, if said first pipeline processing portion is stalled when the processing result in said second pipeline processing portion is transmitted to said first pipeline processing portion, and selects the processing result in said second pipeline processing portion and transmits the processing result to said first pipeline processing portion, when said first pipeline processing portion is not stalled.

5. The data processing apparatus according to claim 1, wherein said latch portion latches said control signal with a clock for discriminating the respective stages.

6. The data processing apparatus according to claim 1, wherein said second pipeline processing portion performs the pipeline processing one cycle or more later than a clock for discriminating the stages of said first pipeline processing portion.

7. The data processing apparatus according to claim 1, wherein said second pipeline processing portion performs the pipeline processing one cycle or less than a clock for discriminating the stages of said first pipeline processing portion.

8. The data processing apparatus according to claim 1, wherein one of said first and second pipeline processing portions includes an integer operation unit, and the other includes an operation unit other than the integer operation unit.

9. A data processing method for performing first and second pipeline processings by dividing a pipeline into a plurality of stages, comprising steps of:
performing said first pipeline processing in a plurality of stages in sequence based on a plurality of control signals provided corresponding to the respective stages, said control signals having timings asynchronous to each other;
performing a first latch processing to latch said control signals inputted to the respective stages with a predetermined clock, said first latch processing latching said plurality of control signals by using a plurality of flip-flops provided corresponding to the respective control signals; and
performing a second pipeline processing in a plurality of stages in sequence based on said latched control signal separately from said first pipeline processing.

10. The data processing method according to claim 9, wherein said control signals are signals for controlling whether or not the pipeline processing is stalled.

11. The data processing method according to claim 9, further comprising a step of performing a second latch processing to latch a processing result in at least one stage in said first pipeline processing with said predetermined clock,
wherein said second pipeline processing comprises a step of utilizing data latched by said second latch processing, when performing the processing in the stage for the data latched by said second latch processing.

12. The data processing method according to claim 9, further comprising steps of:
performing a third latch processing to latch a processing result in at least one stage in said second pipeline processing with said predetermined clock; and
selecting either one of data before latched by said third latch processing and data latched by said third latch processing,
wherein said selecting step includes steps of: selecting a latch output of said third latch processing after the completion of stall and transmitting the latch output to said first pipeline processing, when the processing result in said second pipeline processing is transmitted to said first pipeline processing and said first pipeline processing is stalled; and selecting the processing result in said second pipeline processing and transmitting the processing result to said first pipeline processing, when said first pipeline processing is not stalled.

13. The data processing method according to claim 9, wherein said first latch processing comprises a step of latching said control signal with a clock for discriminating the respective stages.

14. The data processing method according to claim 9, wherein said second pipeline processing performs the pipeline processing one cycle or more later than a clock for discriminating the stages of said first pipeline processing.

15. The data processing method according to claim 9, wherein said second pipeline processing performs the pipeline processing one cycle or less than a clock for discriminating the stages of said first pipeline processing.

* * * * *